(12) United States Patent
Liao et al.

(10) Patent No.: US 8,499,928 B1
(45) Date of Patent: Aug. 6, 2013

(54) CHAIN BOARDS OF A METAL FILINGS CONVEYER

(75) Inventors: Chin-Lien Liao, Taichung (TW); Chung-Mien Liao, Taichung (TW); Hung-Wei Liao, Taichung (TW)

(73) Assignees: Miaw Yeou Metal Industry Co., Ltd., Taichung (TW); Chung-Mien Liao, Taichung (TW); Hung-Wei Liao, Taichung (TW)

( * ) Notice: Subject to any disclaimer, the term of this patent is extended or adjusted under 35 U.S.C. 154(b) by 0 days.

(21) Appl. No.: 13/467,327

(22) Filed: May 9, 2012

(51) Int. Cl.
*B65G 17/06* (2006.01)

(52) U.S. Cl.
USPC .......................................... 198/853

(58) Field of Classification Search
USPC ................... 198/850, 851, 853, 778
See application file for complete search history.

(56) References Cited

U.S. PATENT DOCUMENTS

| | | | | |
|---|---|---|---|---|
| 2,681,728 A * | 6/1954 | Boron | ............................ | 198/851 |
| 2,725,975 A * | 12/1955 | Franz | ............................ | 198/822 |
| 3,980,425 A * | 9/1976 | Pinettes et al. | ................ | 432/239 |
| 4,832,187 A * | 5/1989 | Lapeyre | ......................... | 198/851 |
| 6,827,204 B2 * | 12/2004 | Cribiu' | ......................... | 198/844.1 |
| 7,500,555 B1 * | 3/2009 | Liao | ............................ | 198/844.1 |
| 2004/0222073 A1 * | 11/2004 | Oreste | ............................ | 198/850 |

* cited by examiner

*Primary Examiner* — Gene Crawford
*Assistant Examiner* — Keith R Campbell
(74) *Attorney, Agent, or Firm* — Ming Chow; Sinorica, LLC

(57) ABSTRACT

The chain boards of a metal filings conveyer are respectively formed with a rectangular base plate having two short sides respectively bent inward to form a side plate. The base plate has two broadsides respectively provided along a lengthwise axis with plural pivotal tubes arranged in stagger, and the pivotal tube abutting upon the side plate is cut short to form a notch for the chain board for facilitating the base plate to be compressed and bent to form the side plates. A filling collar with a central insert hole is positioned in the notch of the chain board to fill up the notch for preventing metal filings from dropping into a location between two chain boards and protecting the chain boards from being worn off by the metal filings.

3 Claims, 7 Drawing Sheets

CHAIN BOARDS OF A METAL FILINGS CONVEYER

BACKGROUND OF THE INVENTION

1. Field of the Invention

This invention relates to the chain boards of a metal filings conveyer.

2. Description of the Prior Art

Generally, mechanical processing machinery is installed with a metal filings conveyer for receiving metal filings produced in the course of processing, and transporting the metal filings to a fixed point to be collected. A conventional metal filings conveyer, as shown in FIGS. 1 and 2, includes a plurality of chain boards 1 arranged in parallel, and each chain board 1 is formed with a rectangular base plate 2 having two short sides respectively compressed and bent inward to make up a vertical side plate 3 having a central line (b) that is perpendicular to the lengthwise axis (a) of the base plate 2 to divide the side plate 3 into a first half portion 4 and a second half portion 5, and the second half portion 5 is retracted inward along the lengthwise axis (a) of base plate 2 to form a vertical step with the first half portion 4 of the side plate 3 so that the side plates 3 of two adjacent chain boards 1 can be overlapped on each other. Further, two broadsides of the base plate 2 are respectively disposed along the lengthwise axis (a) with a plurality of pivotal tubes 6 arranged in stagger and at least one pivotal tube 6 abuts upon the second half portion 5 of one of the two side plates 3. In addition, the conventional metal filings conveyer is provided with a plurality of pivotal rods 7 to be respectively inserted in the pivotal tubes 6 at adjacent sides of every two chain boards 1 for connecting the chain boards 1 together to make up a metal filings conveyer.

In order to have the chain boards 1 connected together closely, the series connection length (c) of the pivotal tubes 6 of every two adjacent chain boards 1 must be equal to the distance (d) between two first half portions 4 of the chain board 1, but in this case the length of the pivotal tube 6 abutting upon the second half portion 5 will exceed the bending line (e) of the side plate 3, as shown in FIG. 3, likely to produce interference when the chain board 1 is being integrally formed. In view of the situation, a way of solving the problem of interference is to have the pivotal tube 6, which abuts against the second half portion 5, cut with a skew notch 8 to form a space between this pivotal tube 6 and the side plate 3 to avoid producing interference when the chain board 1 is shaped integrally. However, after the chain boards 1 are combined together to make up a metal filings conveyer, gaps are apt to appear when the metal filings conveyer is operated, and metal filings are likely to drop into the skew notches 8 when the metal filings are received and transported by the metal filings conveyer, resulting in wear and breakage between the chain boards 1 and seriously affecting durability of the metal filings conveyer.

SUMMARY OF THE INVENTION

The objective of this invention is to offer the chain boards of a metal filings conveyer, not only facilitating the base plate of the chain board to be compressed and bent to form side plates, but also enabling the chain boards to be connected closely to prevent metal filings from dropping into a location between the chain boards for protecting the chain boards from being worn off by the metal filings and thus enhancing durability of the metal filings conveyer.

The chain boards of a metal filings conveyer in the present invention includes a plurality of chain boards arranged in parallel and respectively formed with a rectangular base plate having two short sides respectively compressed and bent inward to form side plates. The side plates are respectively provided with a central line perpendicular to the lengthwise axis of the base plate to divide the side plate into a first half portion and a second half portion, and the second half portion is retracted inward along the lengthwise axis of the base plate to form a vertical step with the first half portion. The base plate has two broadsides respectively disposed along the lengthwise axis with a plurality of pivotal tubes arranged in stagger, and at least one pivotal tube abuts upon the second half portion of one of the two side plates. The pivotal tube abutting upon the second half portion is defined to be a first pivotal tube, which has one end near to the second half portion cut short to form a notch for the chain board. A plurality of filling collars are respectively received in the notch of each chain board, respectively bored with a central insert hole that has the same central axis of the pivotal tube. A plurality of pivotal rods are respectively inserted in the pivotal tubes at adjacent sides of every two chain boards and further inserted in the insert holes of the filling collars for connecting the chain boards together to make up a metal filings conveyer.

In a process of manufacturing a metal filings conveyer, when the base plate of the chain board is compressed and bent to form side plates, the notch of the chain board functions to offer a reserved space for facilitating the base plate to be integrally compressed to form the side plates. In addition, when the chain boards are connected together to make up a metal filings conveyer, the notches of the chain boards can be respectively filled up by the filling collars and thus, the chain boards can be combined together more closely. By so designing, when transported by the metal filings conveyer, the metal filings can be prevented from dropping into a location between the chain boards, able to protect the chain boards from being worn off by the metal filings and enhance durability of the metal filings conveyer.

BRIEF DESCRIPTION OF DRAWINGS

This invention will be better understood by referring to the accompanying drawings, wherein.

DETAILED DESCRIPTION OF THE PREFERRED EMBODIMENT

A preferred embodiment of the chain board of a metal filings conveyer 100 in the present invention, as shown in FIGS. 4-7, includes a plurality of chain boards 10, a plurality of filling collars 20 and a plurality of pivotal rods as main components combined together.

Figure 1:
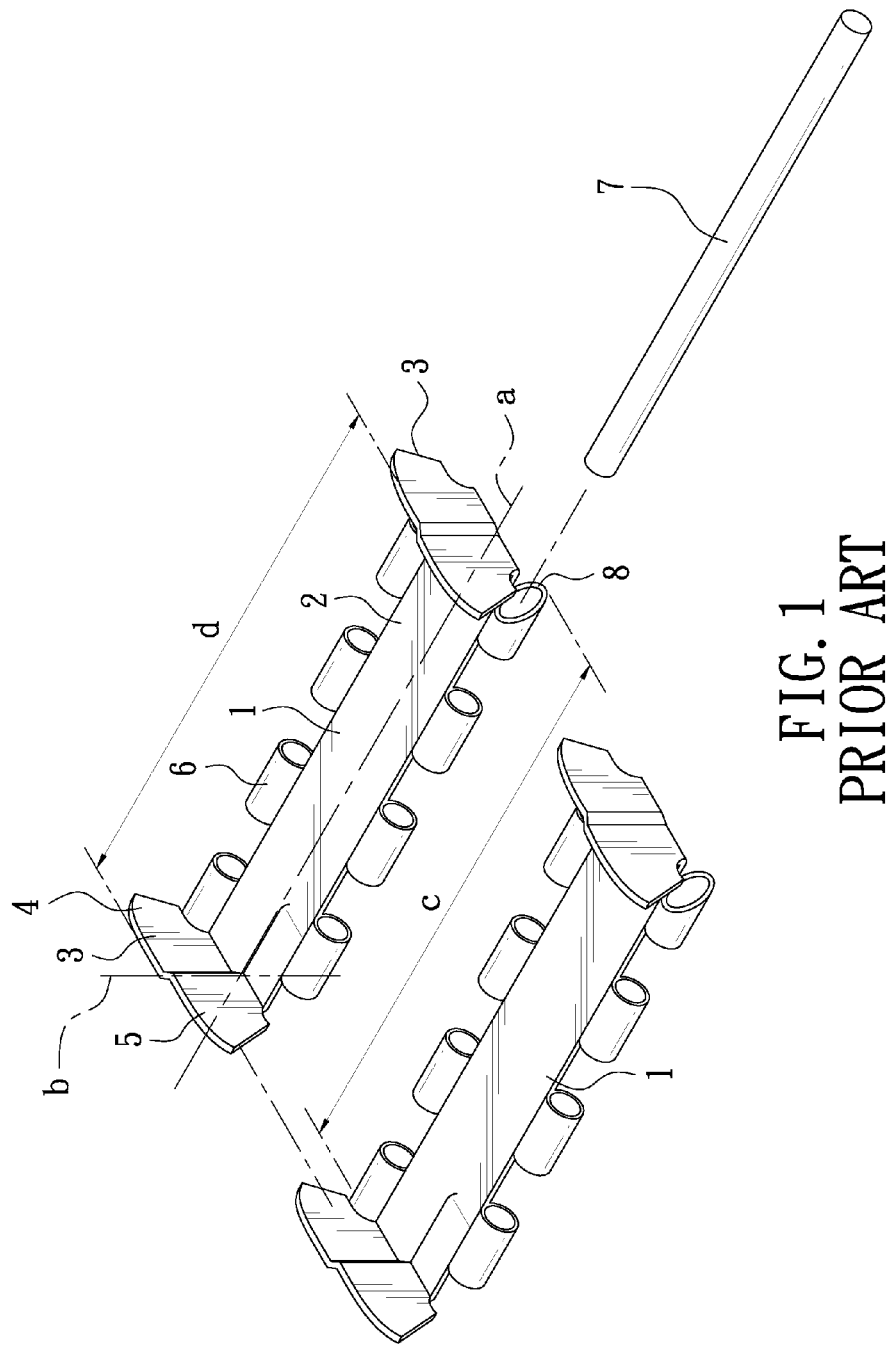
FIG. 1 is an exploded perspective view of a conventional metal filings conveyer.
Figure 2:
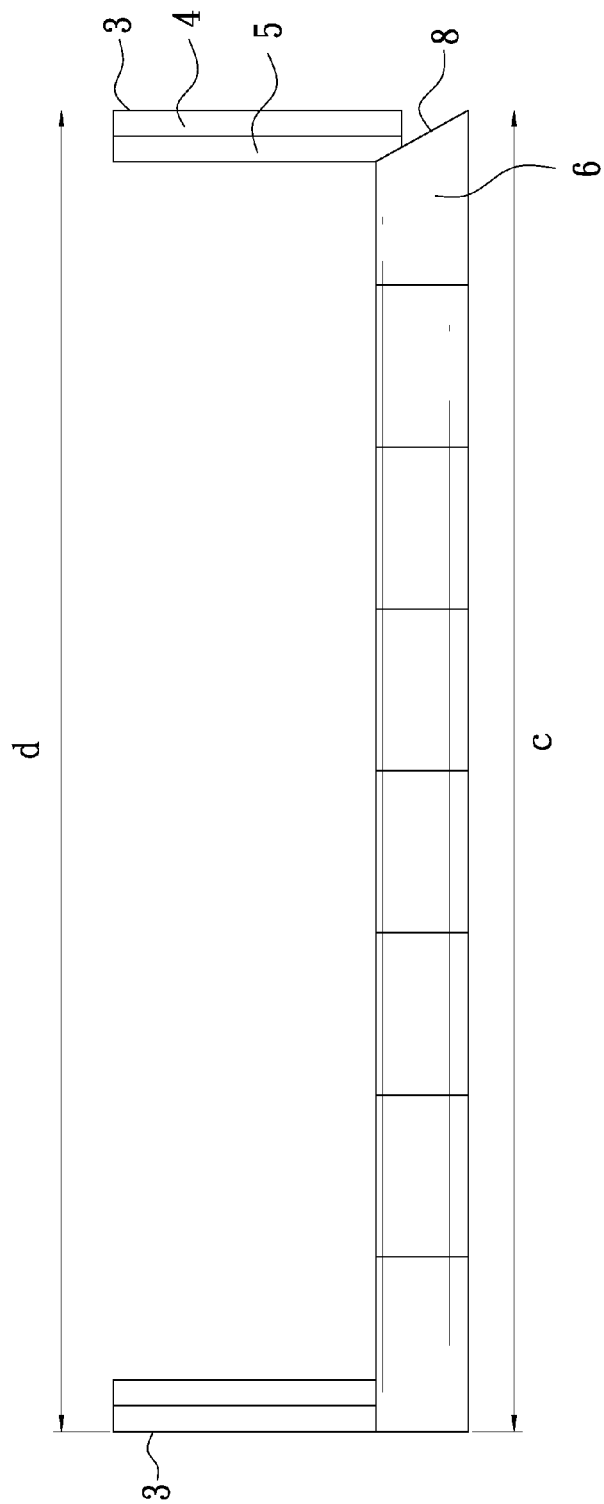
FIG. 2 is a side-sectional view of the conventional metal filings conveyer.
Figure 3:
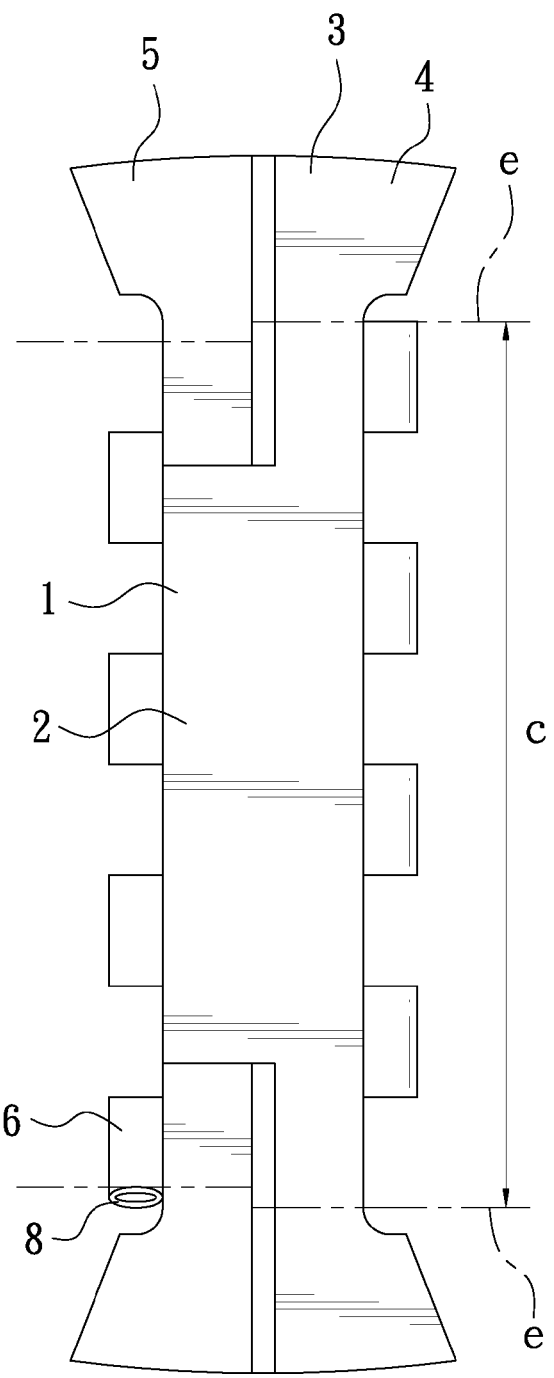
FIG. 3 is plane view of the conventional metal filings conveyer before the chain board is compressed into shape.
Figure 4:
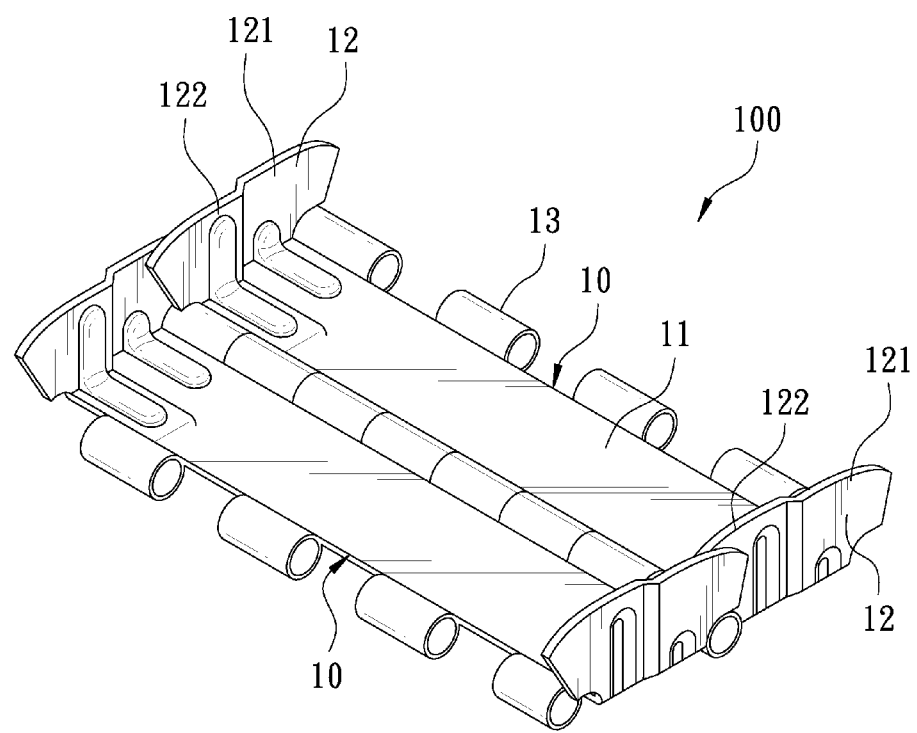
FIG. 4 is a perspective view of the a metal filings conveyer in the present invention.
Figure 5:
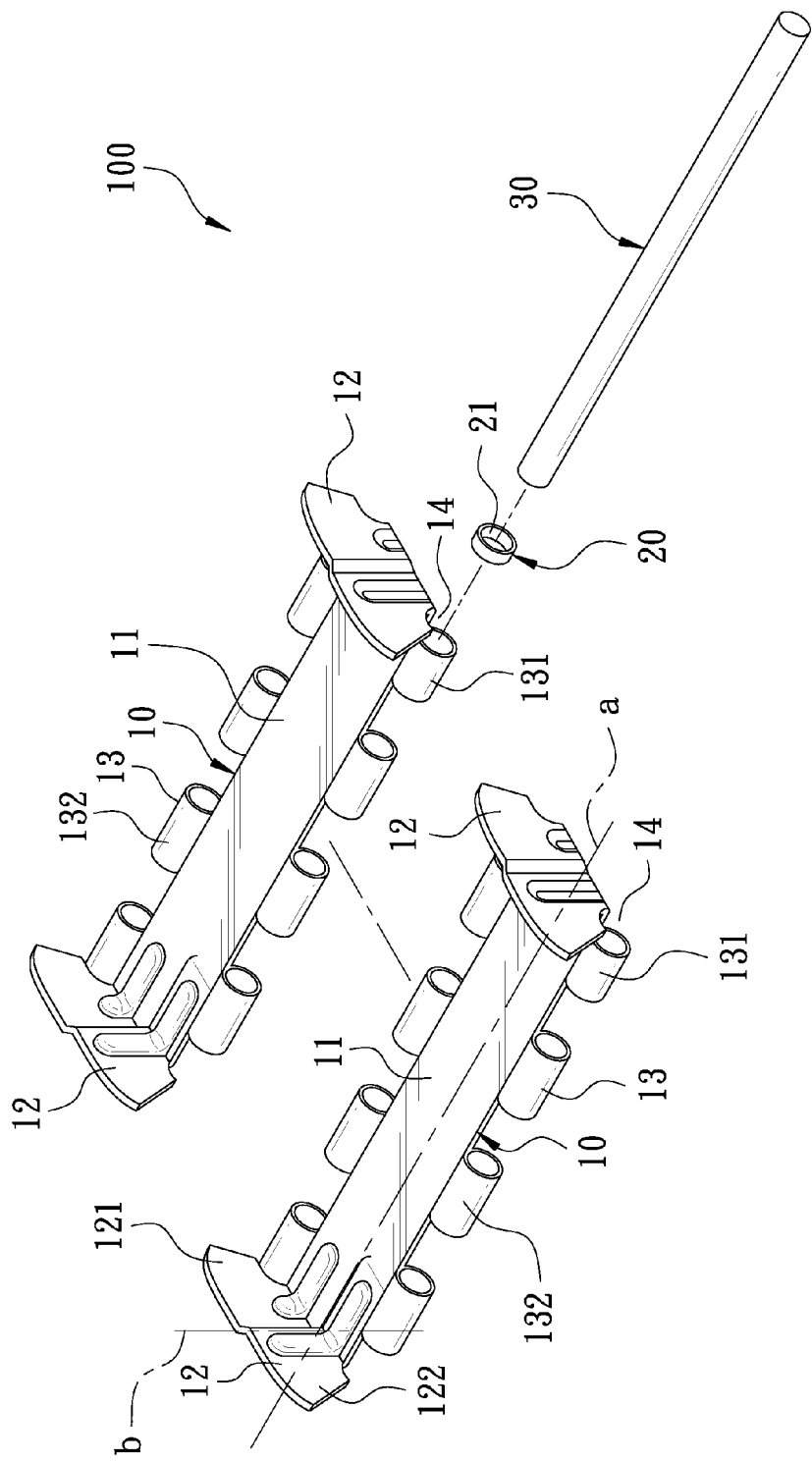
FIG. 5 is an exploded perspective view of the metal filings conveyer in the present invention.

The chain boards 10 are arranged in parallel, respectively formed with a rectangular base plate 11 having two short sides respectively compressed and bent inward along a bending line (e) to form a side plate 12. Each side plate 12 is provided with a central line (b) that is perpendicular to the lengthwise axis (a) of the base plate 11 divide the side plate 12 into a first half portion 121 and a second half portion 122. The second half portions 122 are respectively retracted inward along the lengthwise axis (a) of the base plate 11 to form a vertical step with the first half portion 121, as shown in FIG. 5. Further, the base plate 11 has two broadsides respectively provided along the lengthwise axis (a) with a plurality of pivotal tubes 13 arranged in stagger, and at least one pivotal tube 13 abuts upon the second half portion 122 of one of the two side plates 12. For facilitating explanation, the pivotal tube 13 abutting against the second half portion 122 is defined to be a first pivotal tube 131 and the rest of the pivotal tubes 13 are defined to be second pivotal tubes 132. The first pivotal tube 131 has one end close to the second half portion is cut short to be flush with the bending line (e), letting the chain board 10 form a notch 14 whose width (f) is equal to the thickness (g) of the side plate 12, as shown in FIG. 6.

Figure 6:
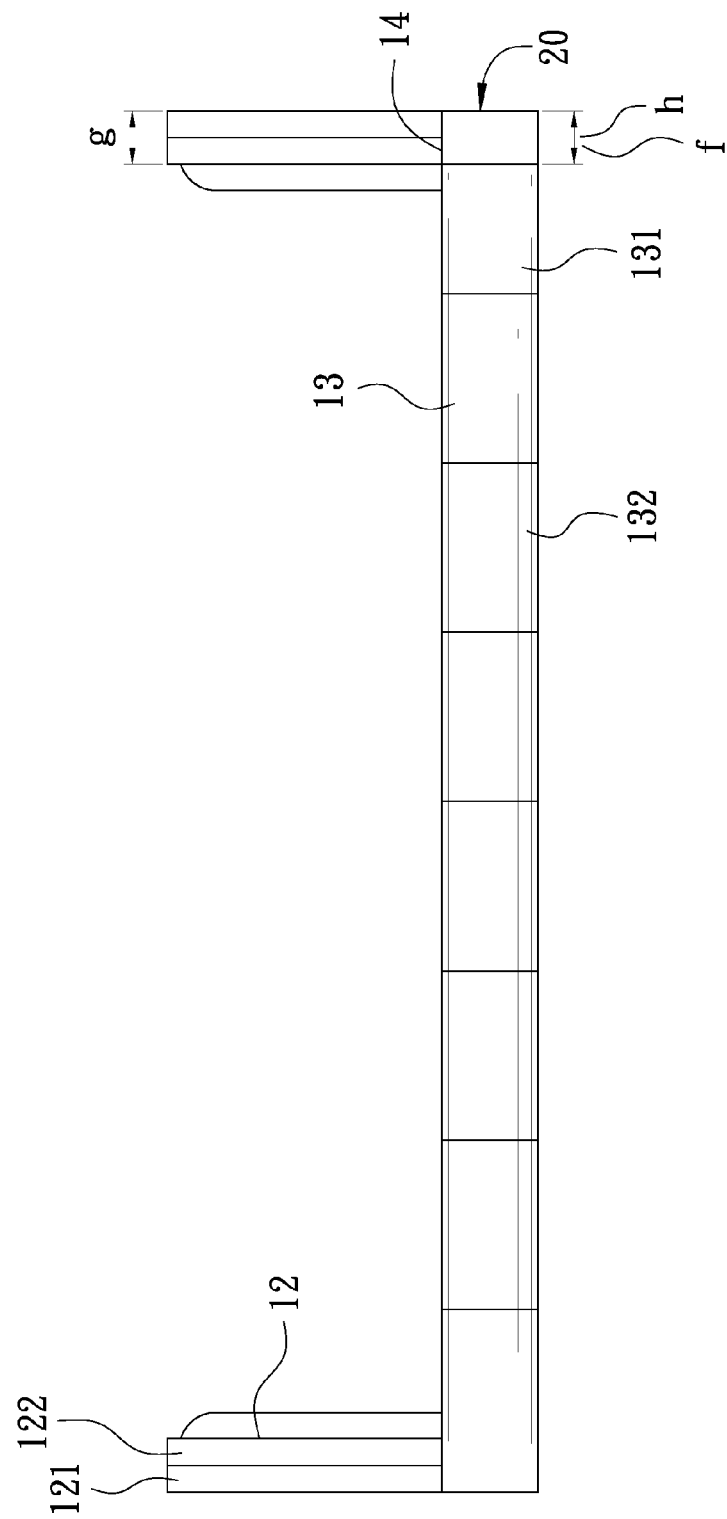
FIG. 6 is a side-sectional view of the metal filings conveyer in the present invention.
Figure 7:
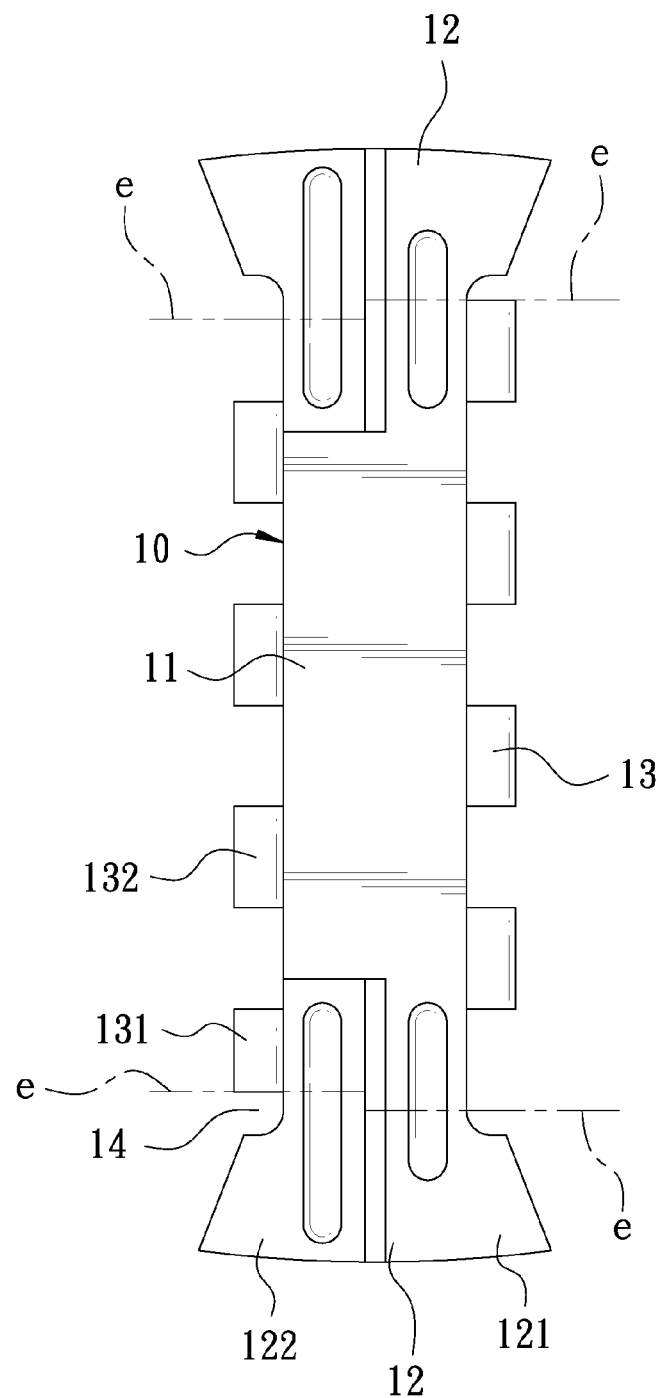
FIG. 7 is a plane view of the metal filings conveyer before the chain board is compressed into shape in the present invention.

The filling collars 20 are respectively filled in the notch 14 of each chain board 10 and respectively bored with a central insert hole 21 that is co-axial with the pivotal tube 131, and the width (h) of the filling collar 20 is equal to the width (f) of the notch 14 of the chain board 10, as shown in FIG. 6.

The pivotal rods 30 are respectively inserted in both the pivotal tubes 13 at adjacent sides of every two chain boards 10 and the insert hole 21 of the filling collar 20 for connecting the chain boards 10 together to make up a metal filings conveyer 100.

Referring to FIGS. 4-7, since the first pivotal tube 131 near to the second half portion 122 has one end cut short to be flush with the bending line (e) to form a notch 14 for the chain board 10; therefore, in a process of manufacturing a metal filings conveyer 100, when the base plate 11 of the chain board 10 is compressed and bent to form the side plates 12, the notch 14 will be able to offer a reserved space to facilitating the base plate 11 to be compressed smoothly to form the side plates 12 by compression equipment, able to attain efficacy of compression forming the side plates 12 with convenience and avoid producing interference.

To connect the chain boards 10 together to make up a metal filings conveyer 100, only have the filling collars 20 respectively filled in the notches 14, letting the filling collar 20 and the first pivotal tube 131 positioned co-axially and then, have the pivotal rods respectively inserted in the corresponding filling collars 20 and the pivotal tubes 13, thus pivotally combining the chain boards 10 together to make the metal filings conveyer 100.

By so designing, two short sides of the base plate 11 of the chain board 10 can conveniently be compression formed into the side plates 12, and since the width (h) of the filling collar 20 is equal to the width (f) of the notch 14 and the width (f) of the notch 14 is equal to the thickness (g) of the side plate 12, the filling collar 20 can completely fill up the notch 14 to make the chain boards 10 connected together comparatively closely. Thus, when transported by the metal filings conveyer 100, the metal filings can be effectively prevented from dropping into locations between the chain boards 10, able to protect the chain boards 10 from being worn off by the metal filings and greatly elevate durability of the metal filings conveyer 100.

While the preferred embodiment of the invention has been described above, it will be recognized and understood that various modifications may be made therein and the appended claims are intended to cover all such modifications that may fall within the spirit and scope of the invention.

What is claimed is:

1. Chain boards of a metal filings conveyer comprising a plurality of chain boards arranged in parallel, each said chain board formed with a rectangular base plate, said base plate having two short sides respectively bent inward to form a side plate, said side plate provided with a central line perpendicular to a lengthwise axis of said base plate, said central line dividing said side plate into a first half portion and a second half portion, said second half portion retracted inward along said lengthwise axis of said base plate to form a step with said first half portion, said base plate having two broadsides respectively disposed along said lengthwise axis with a plurality of pivotal tubes arranged in stagger and at least one side pivotal tube abutting upon said second half portion of one of two said side plates, said metal filings conveyer further comprising a plurality of pivotal rods, said pivotal rods respectively inserted in said pivotal tubes at adjacent sides of every two said chain boards to connect said chain boards together to make up a said metal filings conveyer; and characterized by said pivotal tube, which abuts upon said second half portion, defined to be a first pivotal tube, said first pivotal tube having one end close to said second half portion cut short to form a notch for said chain board; and a plurality of filling collars respectively received in said notch of each said chain board, each said filling collar bored with a central insert hole, a central axis of said insert hole and a central axis of said pivotal tube positioned coaxially, said pivotal rods further respectively inserted in said central insert holes of said filling collars.

2. The chain boards of a metal filings conveyer as claimed in claim 1, wherein a width of said notch is equal to a thickness of said side plate.

3. The chain boards of a metal filings conveyer as claimed in claim 2, wherein a width of said filling collar is equal to that of said notch.

* * * * *